3,804,754
MEMBRANE SEPARATION PROCESS
Kiyoshi Ishii and Syobu Konomi, Saitama, and Yoshio Ishiguro, Tokyo, Japan, assignors to Daicel Ltd., Higashi-ku, Osaka, Japan
No Drawing. Filed Aug. 21, 1972, Ser. No. 282,447
Claims priority, application Japan, Aug. 26, 1971, 46/65,384
Int. Cl. B01d 13/00
U.S. Cl. 210—23                        3 Claims

ABSTRACT OF THE DISCLOSURE

A surfactant is added to an aqueous protein solution undergoing purification or concentration using a semipermeable membrane, in order to improve the water permeation rate of the membrane.

BACKGROUND OF THE INVENTION

Field of the invention

This invention relates to a process for improving the water permeability of semipermeable membranes used for purifying or concentrating an aqueous solution of a protein of natural origin by the reverse osmosis method of ultrafiltration.

Description of the prior art

Techniques for the purification, separation and concentration of aqueous solutions by means of a semipermeable membrane have been greatly improved recently and various membrane filters, ultrafiltration membranes and reverse osmosis membranes have been developed.

The technique of separating a solute or solutes from a solvent with such a membrane can be utilized in the conversion of brine or brackish water into fresh water, concentration or purification of foods, purification of chemicals, secondary or tertially treatment of various waste waters, etc. and said technique has already been utilized in practice. Particularly, the development of improved effective techniques has been desired in the processes for the treatment of waste waters, the recovery of valuable materials and the concentration of foods, because the regulation of waste water quality has become severe.

Generally, separations of aqueous protein solutions, particularly, aqueous solution of protein of natural origin, and emulsions by means of a membrane has been hindered by the fact that the pores of the membrane become choked by the solute within a short period of time, thereby reducing the quantity of water permeation. The reduction in the water permeability of the membrane is caused also by the adhesion of fats contained in the liquid to the surface of the membrane, in addition to the choking of the membrane pores with protein molecules.

In order to prevent a reduction in the water permeation rate, it is necessary to change the properties of the solution or emulsion. Various processes may be carried out for changing these properties. For example, a process in which the fats contained in the liquid are removed by extraction in petroleum ether and a process in which the substances which choke the pores of the membrane are removed by adsorption with activated charcoal are effective. However, neither of these processes is satisfactory in practice. The use of a coagulant has little effect and is undesirable.

SUMMARY OF THE INVENTION

After intensive investigations, we have discovered that, in the concentration treatment of an aqueous solution of a protein of natural origin, such as cheese whey, fish meat-treating water or the thawed white of an egg, by the reverse osmosis method of the ultrafiltration, the separation characteristics of the membrane can be improved by adding a surfactant or surfactants to the aqueous protein solution, being treated, thereby to prevent major reduction in the water permeation rate. The present invention has been attained on the basis of this discovery.

All cationic, anionic, amphoteric and nonionic surfactants are effective in the process of the present invention and, therefore, they can be selected freely depending upon the purpose. For example, when an edible concentrate is to be produced, a nonionic edible surfactant is preferred. If the main purpose is to treat waste water to obtain purified water, any of the above surfactants may be used. Monoglycerides, polyoxyethylene alkyl ethers, alkylbenzene sulfonates, sugar esters and sorbitan esters are among suitable surfactants.

The concentration of the surfactant to be used in the aqueous liquid being treated is generally in the range of from 1 p.p.m. to 0.1% by weight in the liquid being treated. Accordingly, the concentration can be selected within a wide range depending on the purpose.

As for the H.L.B. (hydrophile-lipophile balance) of the surfactant, this is not critical and a substantial difference is not observed throughout the entire range of H.L.B. values for surfactants.

The surfactants used according to the present invention have the effect of preventing choking of the membrane pores as well as the secondary effect of retarding putrefaction of the liquids. This is particularly valuable, because the present invention is employed mainly in the food processing industry.

If the process of the present invention is utilized in the reverse osmosis method, the percentage of removal of the solute present in the aqueous liquid treated is about the same as that obtained when no surfactant is used.

The effects of the present invention will be further shown by means of the following illustrative examples.

EXAMPLE 1

Operation pressure: 42 kg./cm.$^2$
Semipermeable membrane: Cellulose acetate membrane prepared by the formamide process
Surfactant: Nonionic surfactant (polyoxyethylene cetyl ether (Emulgen 210 of Kao Atlas Co.; H.L.B.=10.7)
Amount: 0.05 g./l. of test liquor
Test liquor: Water used for treating fish meat.

Reverse osmosis produceres weer carried out on samples containing and not containing surfactant. The following results were obtained:

| | Values after— | |
|---|---|---|
| | 1 hour | 8 hours |
| Without surfactant: | | |
| Water permeability | 0.68 m.$^3$/m.$^2$/day | 0.20 m.$^3$/m.$^2$/day |
| Rate of removal of protein | 97.0% | 95.3 |
| With surfactant: | | |
| Water permeability | 0.74 m.$^3$/m.$^2$/day | 0.62 m.$^3$/m.$^2$/day |
| Rate of removal of protein | 97.0% | 96.2 |

EXAMPLE 2

Reverse osmosis tests were carried out under the same conditions as in Example 1 except that the same amount of glycerol monostearate (a nonionic surfactant) (Emulsy MS of Takeda Yakuhin Co.; H.L.B.=3.6) was used in place of polyoxyethylene cetyl ether. The following results were obtained:

| | Values after— | |
|---|---|---|
| | 1 hour | 8 hours |
| With surfactant: | | |
| Water permeability | 0.88 m.$^3$/m.$^2$/day | 0.76 m.$^3$/m.$^2$/day |
| Rate of removal of protein | 96.8% | 96.4 |

EXAMPLE 3

Reverse osmosis tests were carried out under the same conditions as in Example 1 except that the same amount of sodium dodecylbenzene sulfonate (an anionic surfactant) was used in place of polyoxyethylene cetyl ether. The following results were obtained:

|  | Values after— | |
|---|---|---|
|  | 1 hour | 8 hours |
| With surfactant: | | |
| Water permeability | 0.67 m.$^3$/m.$^2$/day | 0.56 m.$^3$/m.$^2$/day. |
| Rate of removal of protein | 97.3% | 95.8. |

EXAMPLE 4

Operation pressure: 20 kg./cm.$^2$
Semipermeable membrane: Cellulose acetate membrane prepared by the formamide process
Surfactant: Glycerol monostearate
Amount: 0.1 g./l. of test liquor
Test liquor: Thawed egg white Reverse osmosis tests were carried out on samples containing and not containing surfactant, under the abovemention conditions. The following results were obtained:

|  | Values after— | |
|---|---|---|
|  | 1 hour | 8 hours |
| Without surfactant: | | |
| Water permeability | 0.63 m.$^3$/m.$^2$/day | 0.10 m.$^3$/m.$^2$/day. |
| Rate of removal of protein | 99.9% | 99.6. |
| With surfactant: | | |
| Water permeability | 0.42 m.$^3$/m.$^2$/day | 0.38 m.$^3$/m.$^2$/day. |
| Rate of removal of protein | 99.9% | 99.8. |

The embodiments of the invention in which an exclusive property or privilege is claimed are defined as follows:

1. In a reverse osmosis process for separating dissolved and/or suspended solids from an aqueous protein solution in which the solution is flowed under pressure through a semipermeable membrane and the solids are retained on one side of the membrane and purified water in the liquid phase is recovered from the other side of the membrane, the improvement which comprises mixing in the solution prior to flowing it through said membrane from 1 p.p.m. to 0.1% by weight of organic surfactant effective to minimize choking of the pores of the membrane by protein solids in order to prevent major reduction of the water permeation rate of the membrane.

2. A process according to claim 1, in which the retaind solids are an edible foodstuff and the surfactant is a nonionic edible surfactant.

3. A process according to claim 1, in which the surfactant is selected from the group consisting of monoglycerides, polyoxyethylene alkyl ethers, alkylbenzene sulfonates, sugar esters and sorbitan esters.

References Cited

UNITED STATES PATENTS

| 3,577,339 | 5/1971 | Baird, Jr., et al. | 210—23 |
| 3,367,787 | 2/1968 | Thijssen et al. | 210—22 X |

FRANK A. SPEAR, Jr., Primary Examiner